United States Patent
Kwon et al.

(10) Patent No.: US 12,518,384 B2
(45) Date of Patent: Jan. 6, 2026

(54) LESION DETERMINATION METHOD AND DEVICE

(71) Applicant: MEDIPIXEL, INC., Seoul (KR)

(72) Inventors: Hwi Kwon, Seoul (KR); Se Yeong Park, Seoul (KR); Jihoon Kweon, Seoul (KR); Young Hak Kim, Seoul (KR)

(73) Assignee: MEDIPIXEL, INC., Seoul (KR)

( * ) Notice: Subject to any disclaimer, the term of this patent is extended or adjusted under 35 U.S.C. 154(b) by 0 days.

(21) Appl. No.: 18/852,366

(22) PCT Filed: Mar. 23, 2023

(86) PCT No.: PCT/KR2023/003831
§ 371 (c)(1),
(2) Date: Sep. 27, 2024

(87) PCT Pub. No.: WO2023/191380
PCT Pub. Date: Oct. 5, 2023

(65) Prior Publication Data
US 2025/0166177 A1     May 22, 2025

(30) Foreign Application Priority Data

Mar. 31, 2022 (KR) .................. 10-2022-0040597

(51) Int. Cl.
*G06T 7/00* (2017.01)
*G06T 7/62* (2017.01)

(52) U.S. Cl.
CPC .............. *G06T 7/0012* (2013.01); *G06T 7/62* (2017.01); *G06T 2207/30096* (2013.01); *G06T 2207/30101* (2013.01)

(58) Field of Classification Search
CPC ......... G06T 7/0012; G06T 2207/30101; G06T 2207/30104; G06T 2207/30048;
(Continued)

(56) References Cited

U.S. PATENT DOCUMENTS 7,742,629 B2 *  6/2010  Zarkh ................ G06T 7/564
                                                    348/42
10,561,393 B2 *  2/2020  Lee .................... A61B 8/463
(Continued)

FOREIGN PATENT DOCUMENTS

CN      109886953 A     6/2019
EP      2 977 922 A2     1/2016
(Continued)

OTHER PUBLICATIONS

Machine translation from google patents of KR101511300B1 (Year: 2015).*
(Continued)

*Primary Examiner* — Courtney Joan Nelson
(74) *Attorney, Agent, or Firm* — MARSHALL, GERSTEIN & BORUN LLP

(57) ABSTRACT

An electronic device according to one embodiment can acquire a first trendline related to vessels from a medical image; determine lesion candidates among the vessels on the basis of the first trendline; acquire a second trendline on the basis of a reference point selected in the vicinity of the lesion candidates; and determine a lesion site among the lesion candidates on the basis of the acquired second trendline.

11 Claims, 13 Drawing Sheets

(58) Field of Classification Search
CPC ... G06T 2207/20101; G06T 7/11; G06T 7/62; G06T 2207/30096; G06T 2207/30172; G06T 7/10; G06T 7/13; G16H 50/20; G16H 30/40; G16H 30/20; G16H 50/50; A61B 6/5217; A61B 2576/00; A61B 5/0013; A61B 6/504; A61B 2018/00375; A61B 2576/023; A61B 5/0044; A61B 5/02028; A61B 6/503; A61B 6/507; A61B 2018/00351; A61B 5/026; A61B 5/6869
See application file for complete search history.

(56) References Cited

U.S. PATENT DOCUMENTS

| | | | |
|---|---|---|---|
| 11,246,550 B2 * | 2/2022 | Highnam | A61B 6/502 |
| 2016/0128667 A1 | 5/2016 | Lee et al. | |
| 2018/0218514 A1 | 8/2018 | Berger et al. | |
| 2019/0029625 A1 | 1/2019 | Zhong et al. | |

FOREIGN PATENT DOCUMENTS

| | | | |
|---|---|---|---|
| JP | 2007-075141 A | | 3/2007 |
| JP | 2017536213 A | | 12/2017 |
| JP | 2019072342 A | | 5/2019 |
| KR | 20110129239 A | | 12/2011 |
| KR | 20110129239 A1 | * | 1/2012 |
| KR | 101511300 B1 | * | 4/2015 |
| KR | 20150128405 A | | 11/2015 |
| KR | 20160047516 A | | 5/2016 |
| KR | 20160055007 A | | 5/2016 |
| KR | 20210016862 A | | 2/2021 |
| KR | 10-2272413 B1 | | 7/2021 |
| KR | 10-2279508 B1 | | 7/2021 |
| KR | 20210149350 A | | 12/2021 |
| KR | 102479645 B1 | | 12/2022 |

OTHER PUBLICATIONS

Machine translation from google patents of KR20110129239A1 (Year: 2012).*
International Search Report for PCT/KR2023/003831, mailed Jun. 26, 2023.

* cited by examiner

LESION DETERMINATION METHOD AND DEVICE

FIELD OF THE DISCLOSURE

Hereinafter, a technique for determining a lesion is provided.

BACKGROUND

Interventional procedures using catheters to insert stents and other devices are widely practiced for treating cardiovascular, cerebrovascular, and peripheral vascular conditions. Before proceeding with the procedure, the severity of the patient's lesion is assessed through imaging using cardiovascular angiography. The treatment plan may vary based on the characteristics of the atherosclerotic plaque as observed through angiography. Particularly, when there is a calcified lesion, the rupture of the lesion may cause calcified fragments blocking the ends of branches, which may lead to a myocardial infarction. Additionally, according to the SYNTAX score, surgical methods may offer a better prognosis when there is a plurality of lesions in the coronary arteries and many of them are calcified. In this context, there is a demand for technology that may detect calcified lesions using X-ray angiography images instead of computed tomography (CT).

The above description is information the inventor(s) acquired during the course of conceiving the present disclosure, or already possessed at the time, and is not necessarily art publicly known before the present application was filed.

SUMMARY

Technical Goals

An electronic device according to an embodiment may identify lesions that may exist in multiple numbers in a vessel that is an analysis target in a vascular image.

An electronic device according to an embodiment may identify a lesion candidate and determine a clinically significant lesion.

However, the technical goals are not limited to the foregoing goals, and there may be other technical goals.

Technical Solutions

According to an embodiment, a lesion determination method performed by a processor includes obtaining a first trendline related to a diameter of a vessel from a medical image, determining a lesion candidate within the vessel based on the first trendline, obtaining a second trendline based on a reference point selected around the lesion candidate, and determining a lesion site within the lesion candidate, based on the obtained second trendline.

The obtaining of the first trendline may include calculating, based on a line perpendicular to a centerline of a vascular region, which is an analysis target in the medical image, a diameter within the vascular region for a position along the centerline and obtaining the first trendline based on the calculated diameter.

The obtaining of the first trendline may include segmenting the vascular region, which is the analysis target in the medical image, into one or more vessel segments, calculating an initial regression line, based on regression analysis using a prior slope for the one or more vessel segments, excluding an outlier selected based on the calculated initial regression line from diameters of positions along a centerline within the vessel segment, and calculating a regression line based on the diameters from which the outlier is excluded.

The excluding of the outlier may include determining, as the outlier, a value that falls outside a range determined based on the initial regression line among the diameters of the positions along the centerline within the vessel segment.

The obtaining of the first trendline may include repeating exclusion of the outlier and calculation of the regression line until a ratio of a diameter determined as the outlier among the diameters of the positions along the centerline within the vessel segment is less than a threshold abnormality ratio.

The obtaining of the first trendline may include segmenting the vascular region, which is the target analysis in the medical image, into one or more vessel segments and determining whether to merge trendlines calculated for each of the one or more vessel segments and a vessel segment adjacent to a corresponding vessel segment.

The segmenting of the vascular region into the one or more vessel segments may include segmenting the vascular region into the one or more vessel segments based on a vessel bifurcation, and the determining of whether to merge the trendlines may include calculating the trendlines for the one or more vessel segments and determining whether to merge the trendlines based on trend values of adjacent positions based on the vessel bifurcation on the trendlines.

The segmenting of the vascular region into the one or more vessel segments may include determining whether to segment the vascular region into the one or more vessel segments based on the vessel bifurcation, based on a diameter value at the vessel bifurcation of a first vessel segment close to an a coronary artery ostium among adjacent vessel segments with respect to the vessel bifurcation and a diameter value at the vessel bifurcation of a second vessel segment far from the coronary artery ostium.

The calculating of the trendlines may include limiting a slope of a trendline exceeding a reference trendline among the trendlines to the reference slope.

The determining of whether to merge the trendlines may include determining a new trendline by merging a trendline for a first vessel segment with a trendline for a second vessel segment, based on a trend value of a distal position being less than a trend value of a proximal position, wherein the trend value of the distal position is on a trendline calculated for the first vessel segment close to a coronary artery ostium among adjacent vessel segments and the trend value of the proximal position is on a trendline calculated for the second vessel segment far from the coronary artery ostium.

The determining of the lesion candidate may include determining, as the lesion candidate, a portion of a vascular region in the medical image, wherein the portion has a diameter less than a value obtained by applying a first ratio to the first trendline.

The obtaining of the second trendline based on the reference point selected around the lesion candidate may include selecting a local peak as the reference point, the local peak having a value greater than the first trendline around the lesion candidate.

The selecting of the local peak as the reference point may include selecting, as the reference point, a point at which a value corresponding to a diameter of the vascular region appears among values obtained by applying a threshold reference ratio to the first trendline, based on the local peak being greater than a value obtained by applying the threshold reference ratio to the first trendline.

The selecting of the local peak as the reference point may include attempting redetection of the local peak, based on a value obtained by applying a threshold local ratio to the first trendline, based on at least one of a first reference point (e.g., a proximal reference point) close to a coronary artery ostium and a second reference point (e.g., a distal reference point) far from the coronary artery ostium around the lesion candidate.

The lesion determination method may further include excluding, from determination of a lesion site, a lesion candidate among lesion candidates for which detection of at least one of a first reference point close to a coronary artery ostium and a second reference point far from the coronary artery ostium is failed.

The determining of the lesion site may include determining, as the lesion site, a region with a diameter less than a value obtained by applying a second ratio to the second trendline, within a region corresponding to the lesion site.

The determining of the lesion site may include determining the second ratio based on a value of a corresponding point on the first trendline.

The determining of the lesion site may include, when lesion candidates are adjacent to each other, based on a ratio between a maximum diameter value among diameter values in an intermediate region between the lesion candidates and a value along the first trendline at a point corresponding to the maximum diameter value, determining whether to determine the lesion candidates and the intermediate region as a single lesion site.

The determining of the lesion site may include, when lesion candidates are adjacent to each other, determining to merge the lesion candidates adjacent to each other when a distance between the lesion candidates is less than a predetermined value.

According to an embodiment, an electronic device includes an image obtainer configured to obtain a medical image, a display configured to output the medical image, a memory configured to store computer-executable instructions, and a processor configured to execute the computer-executable instructions stored in the memory, wherein the computer-executable instructions may be configured to output, on the display along with the medical image, at least one of a first trendline related to a global trend of a vessel diameter for each of a plurality of vessel segments segmented from a vessel comprised in the medical image, a reference point positioned above the first trendline, a second trendline related to a local trend of the vessel diameter determined based on the reference point, and a lesion site positioned below the second trendline.

Effects of the Invention

An electronic device according to an embodiment may improve user convenience by providing automated segmentation and quantitative analysis of a vascular image.

An electronic device according to an embodiment may detect a plurality of lesions in a vessel from a medical image.

An electronic device according to an embodiment may intuitively provide information about a lesion even to an analyst lacking medical experience and/or knowledge by visualizing a lesion and trendlines used as criteria for assessing a lesion.

DETAILED DESCRIPTION

Figure 1:
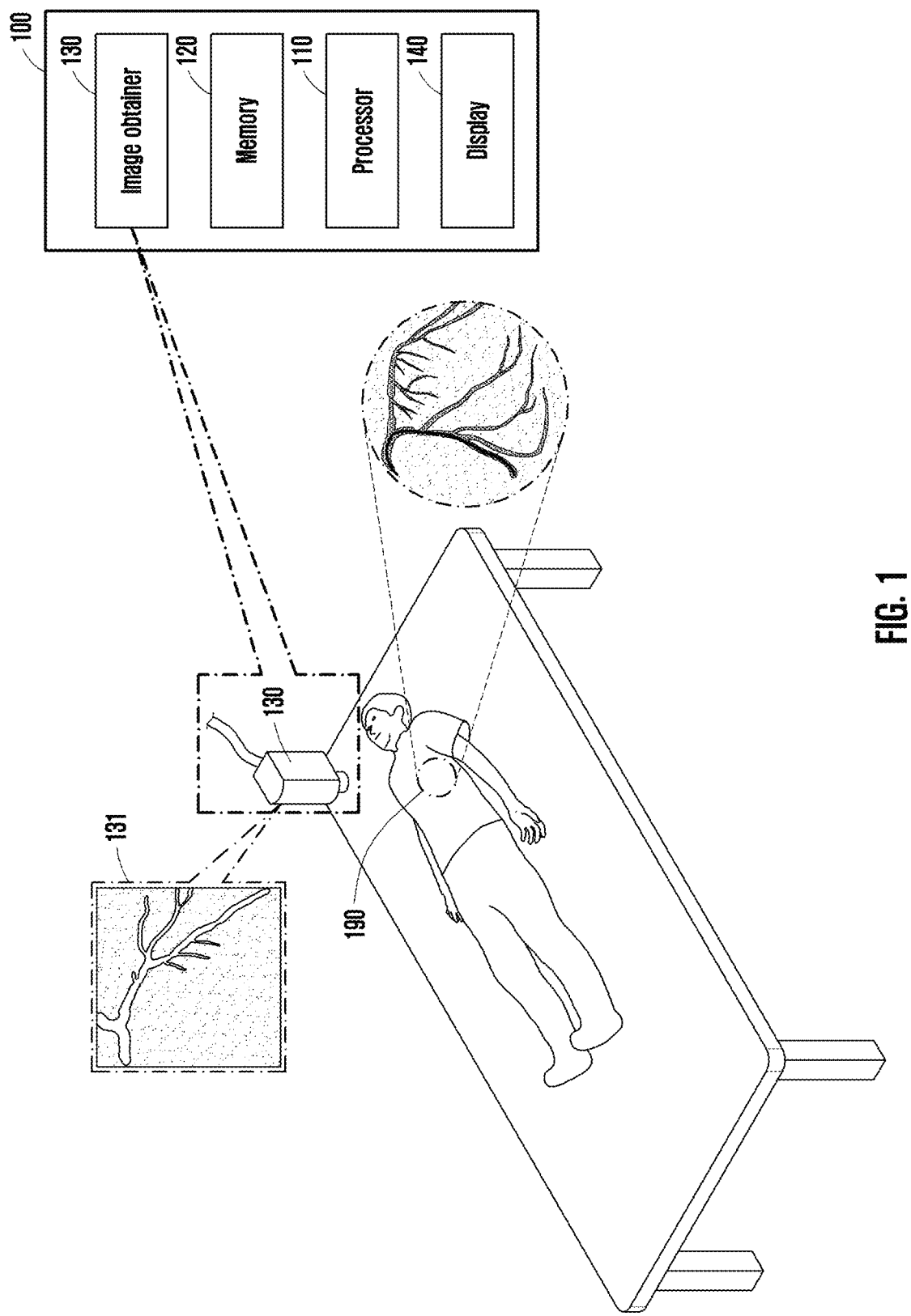
FIG. 1 illustrates an electronic device according to an embodiment.

The following detailed structural or functional description is provided as an example only and various alterations and modifications may be made to embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, components, or groups thereof, but do not preclude the presence or addition of one or more other features, integers, steps, operations, elements, components, or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 illustrates an electronic device according to an embodiment.

An electronic device 100 according to an embodiment is a device for analyzing a medical image. The electronic device 100 may include an image obtainer 130, a processor 110, a display 140, and a memory 120.

The image obtainer 130 may obtain a medical image 131. The medical image 131 obtained by capturing a vessel of a target object (e.g., a subject 190) may also be referred to as a vascular image. For example, the image obtainer 130 may include X-ray capturing equipment and capture the medical image 131 (e.g., an X-ray-based coronary angiography (hereinafter, "CAG") image) through X-ray-based CAG.

The medical image 131 may include one or more frames. A contrast agent may be injected into the vessel of the subject 190 to capture the vessel, and while the contrast agent is maintained, the vessel of the subject 190 may be captured. Of frames of the medical image 131, a frame in which the contrast agent is observed may be referred to as a contrast frame. In the X-ray-based CAG image, an intensity value of each pixel is an intensity according to transmission of X-rays, and an intensity value at a point at which X-rays are absorbed by the contrast agent may appear low. Herein, an image of a contrast frame among X-ray-based CAG images is mainly described as an example of the medical image 131. However, this is for ease of description, and embodiments are not limited thereto. The operations described below with reference to FIGS. 2 to 16 for lesion determination may also be applied to other medical images in which vessels are captured.

For reference, although an example is described in which the image obtainer 130 captures the medical image 131 using X-ray capturing equipment, embodiments are not limited thereto. The image obtainer 130 may include a communication module for wired communication and/or wireless communication and may also receive a vascular image (e.g., an X-ray-based CAG image) from an external capturing device through the communication module.

The processor 110 may output, on the display 140 along with the medical image, at least one of a first trendline related to a global trend of a vessel diameter for each of a plurality of vessel segments segmented from a vessel included in a medical image, a reference point positioned above the first trendline, a second trendline related to a local trend of a vessel diameter determined based on the reference point, and a lesion site positioned below the second trendline. The first trendline may also be referred to as a global trendline, and the second trendline may also be referred to as a local trendline. The processor 110 may select at least one of the first trendline, the reference point, the second trendline, and the lesion site, based on an input from a user (e.g., an analyst). The processor 110 may output a graphical representation indicating selected information using the display 140. An operation of the processor 110 is described with reference to FIGS. 2 to 16 below. For example, obtaining of the first trendline is described with reference to FIGS. 3 to 9 below, determination of a lesion candidate is described with reference to FIG. 10 below, setting of the reference point and obtaining of the second trendline are described with reference to FIGS. 11 to 14 below, and determination of a lesion site is described with reference to FIGS. 15 and 16 below.

The display 140 may output the medical image 131. In addition, the processor 110 may visualize (e.g., overlay) a graphical representation indicating at least one of the first trendline, the reference point, the second trendline, and the lesion site in the medical image 131 through the display 140.

The memory 120 may store at least some frames or all frames of the medical image 131. The memory 120 may store information (e.g., the position, size, vessel diameter, etc. of a lesion site) about a detected lesion site. In addition, the memory 120 may temporarily and/or permanently store data and/or information required to perform a method of determining a lesion through analysis of the medical image 131.

The electronic device 100 according to an embodiment may intuitively provide information on a vessel to quantitatively evaluate the severity of a lesion. The electronic device 100 may automatically set not only lesion candidates but also a reference point for determining whether or not there is a lesion. The electronic device 100 may also identify a plurality of lesions in a single vessel.

Figure 2:
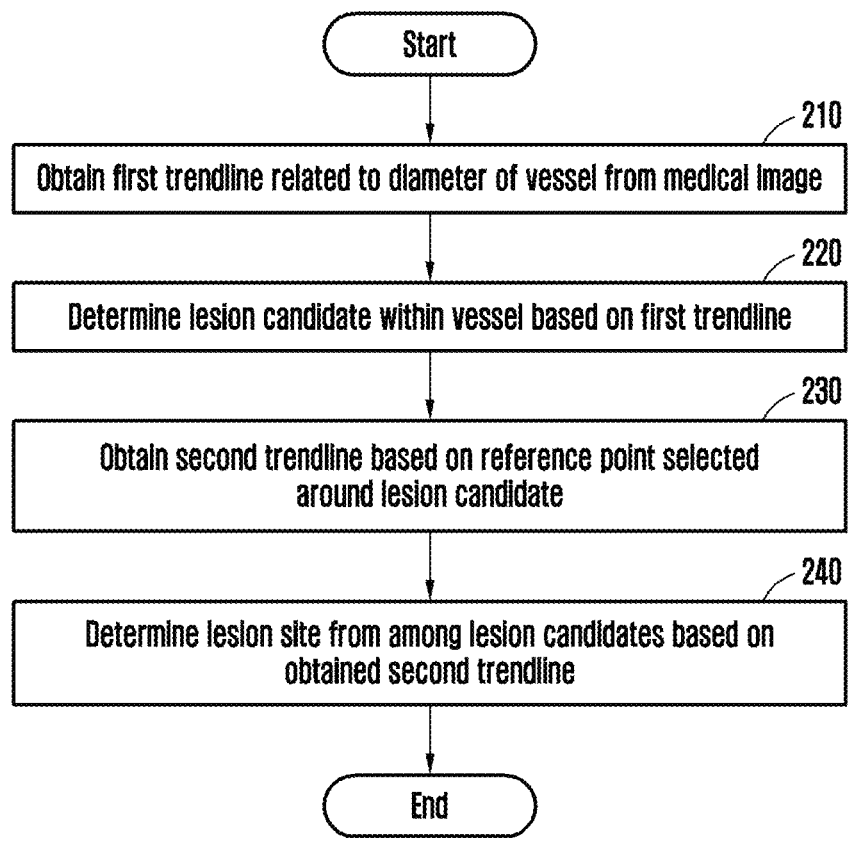
FIG. 2 is a flowchart illustrating a method of determining a lesion, according to an embodiment.

FIG. 2 is a flowchart illustrating a method of determining a lesion, according to an embodiment.

First, in operation 210, an electronic device (e.g., the electronic device 100 of FIG. 1) may obtain a first trendline related to the diameter of a vessel from a medical image. As described above with reference to FIG. 1, the medical image may be an X-ray-based CAG image but is not limited thereto. The diameter of the vessel may indicate the internal diameter through which blood may flow in the vessel. However, herein, for ease of description, the description is primarily given in terms of diameter, but embodiments are not limited thereto, and the description may also be given in terms of the width of a vessel. The first trendline is a trendline showing a global trend of a vascular region and/or a vessel segment segmented from the vascular region and may also be referred to as a global trendline.

Then, in operation 220, the electronic device may determine a lesion candidate within the vessel, based on the first trendline. The lesion candidate may be a candidate portion that may potentially be a lesion in a vessel. The electronic device may determine a corresponding portion of the vessel as a lesion candidate, based on the difference between values (e.g., a first trend value) according to the first trendline and diameter values at the corresponding portion. A value along with a trendline may also be referred to as a trend value. Determination of a lesion candidate based on the first trend value and a diameter value is described below with reference to FIG. 10. The trend value may also be used to determine whether to merge trendlines described below with reference to FIGS. 6 and 7.

Subsequently, in operation 230, the electronic device may obtain a second trendline based on a selected reference point around the lesion candidate. A part around the lesion candidate may include a part (e.g., a proximal part) adjacent to the lesion candidate in a direction closer to a coronary artery ostium and a part (e.g., a distal part) adjacent to the lesion candidate in a direction away from the coronary artery ostium. Herein, a coronary artery may be, for example, the entire vessel in a tree structure that branches off from the aortic root and extends toward the heart. The electronic device may set a reference point around the lesion candidate based on the first trendline. As described below, the reference point is a point on a vessel diameter graph, the point being a reference for obtaining the second trendline. The electronic device may obtain the second trendline by connecting two reference points set adjacent to each other. Setting of the reference point and obtaining of the second trendline are described below with reference to FIGS. 11 to 14.

Then, in operation 240, the electronic device may determine a lesion site from among lesion candidates, based on the obtained second trendline. The electronic device may determine at least some of parts corresponding to the lesion candidates as a lesion site or may exclude some of a plurality of lesion candidates from the determination of a lesion site. The determination of a lesion site is described below with reference to FIGS. 15 and 16.

FIGS. 3 to 9 illustrate segmentation of a vascular region and merging of trendlines, according to an embodiment.

Figure 3:
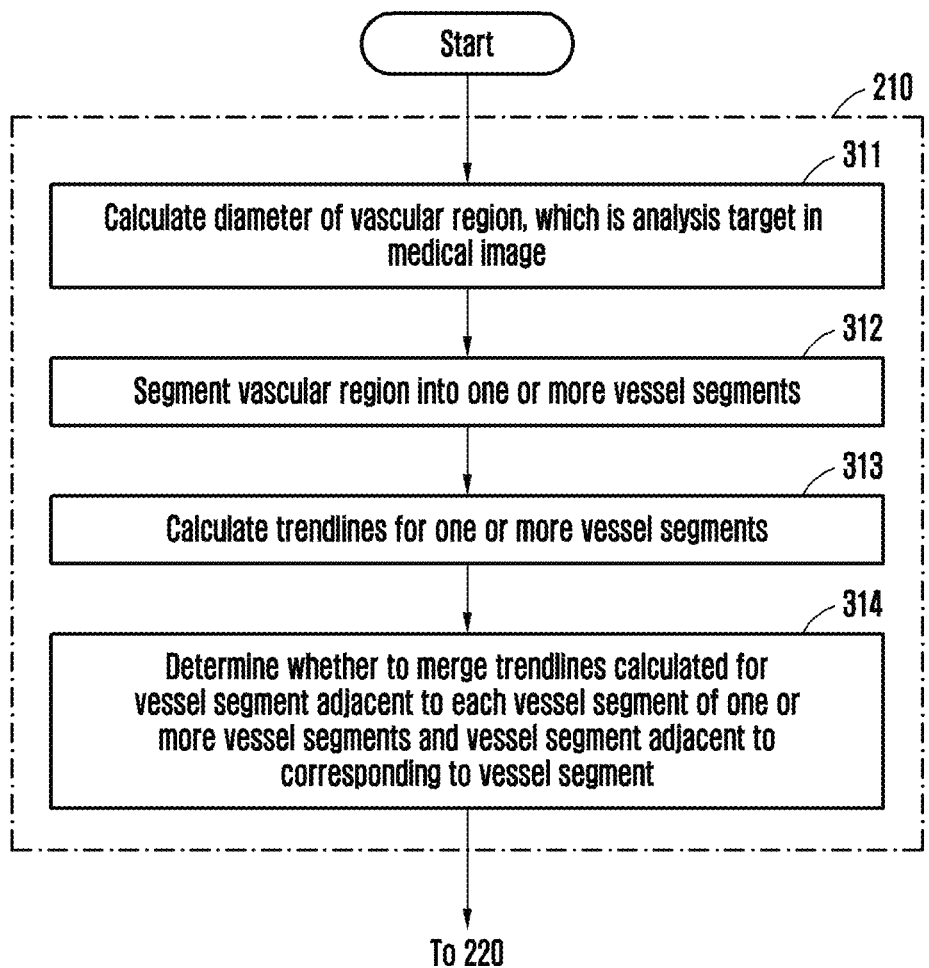
FIGS. 3 to 9 illustrate segmentation of a vascular region and merging of trendlines, according to an embodiment.

FIG. 3 is a flowchart illustrating segmentation of a vascular region and merging of trendlines. Trendlines described with reference to FIGS. 3 to 9 may be first trendlines, for example, global trendlines related to global trends of vascular regions and/or vessel segments. For reference, herein, it is mainly described that a region from a coronary artery ostium to a terminal vessel for each branch is an analysis target, but embodiments are not limited thereto. For example, an electronic device (e.g., the electronic device 100 of FIG. 1) may determine whether to include a vessel bifurcation in the analysis target, based on the diameter of the vessel bifurcation. The electronic device may exclude the vessel bifurcation from the analysis target when the diameter of the vessel bifurcation is less than an analysis threshold and may include the vessel bifurcation in the analysis target when the diameter of the vessel bifurcation is greater than or equal to the analysis threshold.

Figure 4:
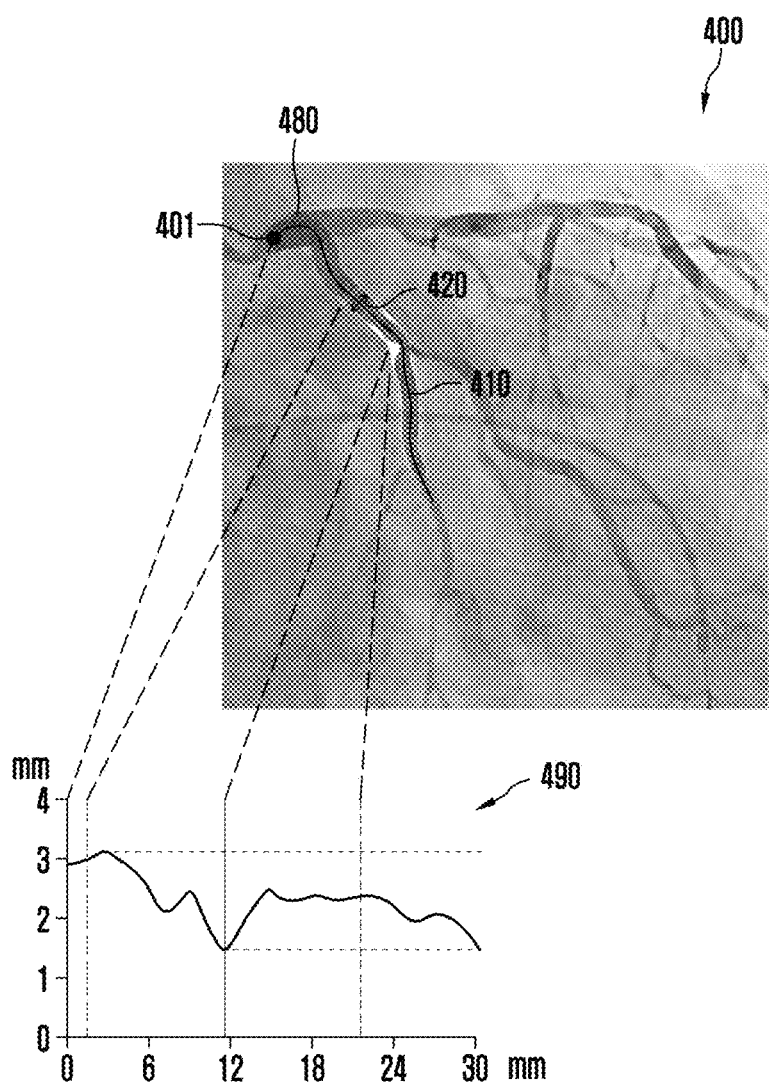

First, in operation 311, the electronic device may calculate the diameter of a vascular region 480, which is an analysis target in a medical image 400. For example, the electronic device may calculate a diameter within the vascular region 480 for each position along a centerline 410, based on a line 420 perpendicular to the centerline 410 of the vascular region 480, which is the analysis target in the medical image 400. The centerline 410 of the vascular region 480 is a line passing through the center of a vessel and may be a line connecting center points of the inner diameter of the vessel longitudinally. The position along the centerline 410 may be a position spaced apart from a start position 401 by a predetermined length along the centerline 410. The diameter at the position along the centerline 410 may be the length (or spacing) between the inner walls of a vessel along the line 420 perpendicular to the centerline 410 at the corresponding position. The electronic device may obtain vessel diameter information indicating a vessel diameter at each position along the centerline 410. In FIG. 4, vessel diameter information may be illustrated as a vessel diameter graph 490. The vessel diameter graph 490 may include, for example, a diameter of y millimeters (mm) at a position spaced x mm apart from the start position 401 along the centerline 410. For reference, the start position 401 may be, for example, a point indicating a coronary artery ostium but is not limited thereto and may vary depending on design. For example, the start position 401 may be set as the start point of a vessel segment, that is, the point closest to the coronary artery ostium in the vessel segment.

An electronic device according to an embodiment may obtain a first trendline based on the diameter calculated as described above. For example, the electronic device may calculate the first trendline for a vessel segment segmented from the vascular region 480, as described below.

For example, in operation 312, the electronic device may segment the vascular region into one or more vessel segments. The electronic device according to an embodiment may segment a vascular region, which is an analysis target in a medical image, into one or more vessel segments. For example, the electronic device may segment the vascular region into one or more vessel segments based on a vessel bifurcation. In the process of segmenting the vascular region into one or more vessel segments, a vessel bifurcation excluded from the analysis target may also be used as a criterion for segmentation. For reference, the electronic device according to an embodiment may skip determination of a lesion candidate and/or a lesion site for a region corresponding to a vascular bifurcation.

For example, the electronic device may determine whether to segment a vascular region into one or more vessel segments based on a vascular bifurcation, based on a diameter value at a vascular bifurcation of a first vessel segment closer to a coronary artery ostium among adjacent vessel segments based on the vascular bifurcation and a diameter value at a vascular bifurcation of a second vessel segment farther from the coronary artery ostium. The diameter value at the vascular bifurcation of the first vessel segment is a diameter value at a position far from the coronary artery ostium within the first vessel segment and may thus also be referred to as a distal diameter value of the first vessel segment. Similarly, the diameter value at a vascular bifurcation of the second vessel segment may also be referred to as a proximal diameter value of the second vessel segment.

The electronic device may determine whether to separate the first vessel segment from the second vessel segment, based on the difference between the distal diameter value of the first vessel segment and the proximal diameter value of the second vessel segment. The electronic device may separate the first vessel segment from the second vessel segment, based on the difference between the distal diameter value of the first vessel segment and the proximal diameter value of the second vessel segment exceeding a segmentation threshold. The electronic device may determine that the first vessel segment and the second vessel segment are the same vessel segment, based on the difference between the distal diameter value of the first vessel segment and the proximal diameter value of the second vessel segment being less than or equal to the segmentation threshold.

Figure 5:
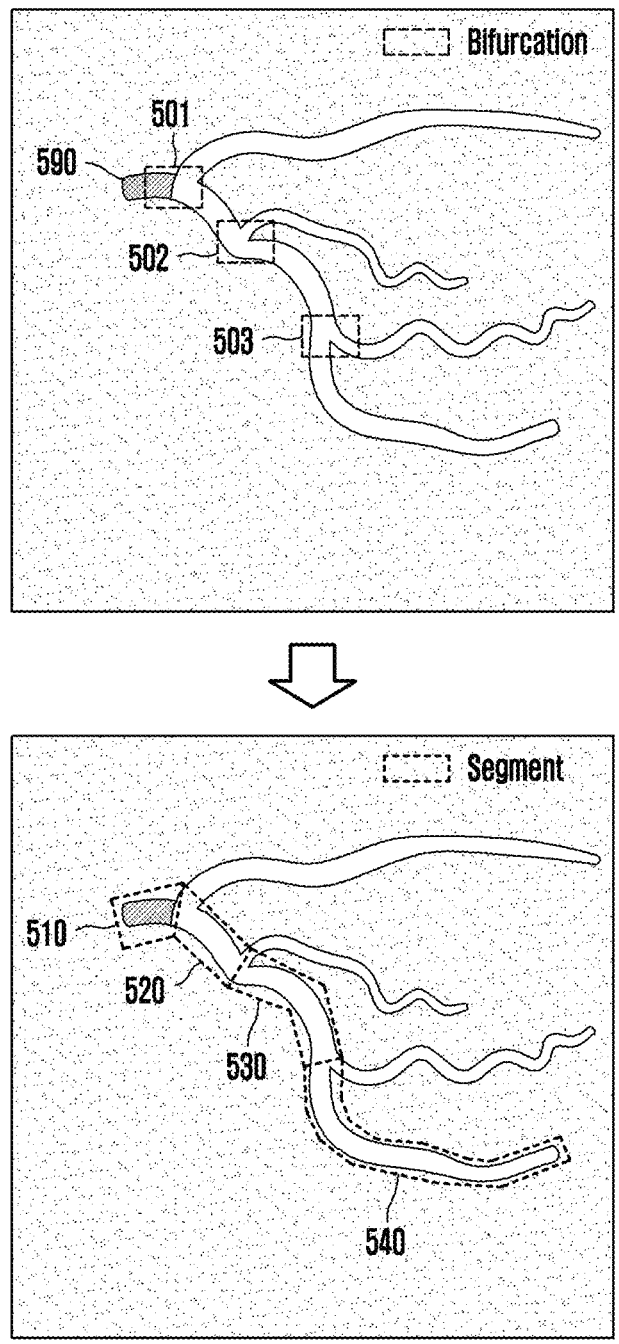

FIG. 5 illustrates an example in which a first intermediate segment 520 is separate from a second intermediate segment 530 based on a first bifurcation 502 and the second intermediate segment 530 is separate from a distal segment 540 based on a second bifurcation 503. In addition, when a vascular region includes a coronary artery ostium 590, segments may be generated based on the coronary artery ostium 590 (for example, a boundary of segments may be designated). The same technique may be used to separate a distal segment 510 from the first intermediate segment 520 based on a position 501 at which the left anterior descending (LAD) artery and the left circumflex (LCx) artery branch off from the left main (LM).

Then, in operation 313, the electronic device may calculate trendlines for one or more vessel segments. An electronic device according to an embodiment may calculate an initial regression line based on regression analysis using a prior slope for one or more vessel segments. The prior slope may be a slope set as an initial value for regression analysis and may have different values depending on where a vessel segment is positioned. For example, the prior slope of a vessel segment disposed at a predetermined position may be different from the prior slope of another vessel segment disposed at a different position. The electronic device may exclude an outlier selected based on the initial regression line calculated from diameters of positions along a centerline within a vessel segment. An outlier may be an abnormal value among the diameter values. For example, the electronic device may determine, as an outlier, a diameter value among diameters of positions along the centerline within the vessel segment, the diameter value falling outside a range determined with respect to the initial regression line. The electronic device may determine, as an outlier, a diameter value exceeding a range of [value along the regression line+a*std, value along the regression line+b*std] based on the regression line (or initial regression line). std may denote the standard deviation of the regression line, and a and b are real numbers that may denote weights for setting an outlier determination range. The electronic device may calculate the regression line based on diameters from which an outlier is excluded.

The electronic device may repeat exclusion of an outlier and calculation of the regression line until the ratio of a diameter determined as an outlier among the diameters of positions along the centerline within the vessel segment is less than a threshold abnormality ratio (e.g., n %, where n is a real number greater than 0 and less than 100). The electronic device may determine, as a first trendline for a corresponding vessel segment, a regression line showing an outlier less than the threshold abnormality ratio.

Then, in operation 314, the electronic device may determine whether to merge the trendlines (e.g., the trendlines calculated in operation 313 described above) calculated for each vessel segment of one or more vessel segments and a vessel segment adjacent to a corresponding vessel segment. The one or more vessel segments may be segmented from a vascular region, which is an analysis target in a medical image. The electronic device may determine whether to merge trendlines based on trend values at adjacent positions based on vessel bifurcations on the trendlines. A trend value at a predetermined position (e.g., a position×mm away from a start position) in a vascular region and/or a vessel segment may be a value along a trendline corresponding to a corresponding position (e.g., the position x mm away from the start position) as described above.

For example, the electronic device may determine a new trendline obtained by merging a trendline for the first vessel segment and a trendline for the second vessel segment, based on a trend value (e.g., a distal trend value) at a distal position on a trendline calculated for the first vessel segment closer to the coronary artery ostium being less than a trend value (e.g., a proximal trend value) at a proximal position on a trendline calculated for the second vessel segment farther from the coronary artery ostium, among adjacent vessel segments. The electronic device may determine a new first trendline based on regression analysis for vessel segments where it is determined that trendlines are to be merged.

Figure 6:
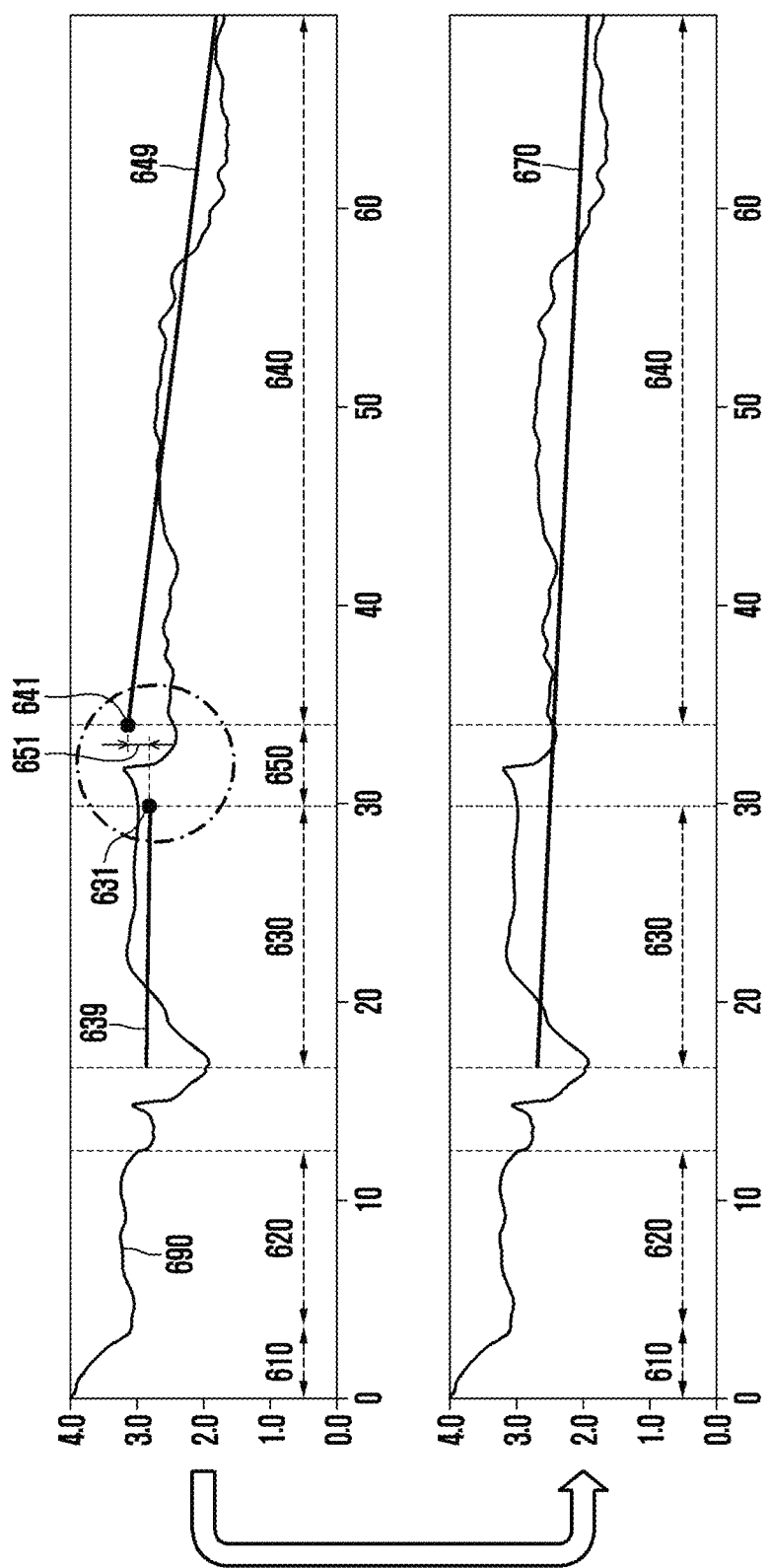

For example, in the example illustrated in FIG. 6, an electronic device may determine whether to merge a first trendline 639 of a second intermediate segment 630 with a first trendline 649 of a distal segment 640. In the example illustrated in FIG. 6, since a distal trend value 631 of the second intermediate segment 630 is less than a proximal trend value 641 of the distal segment 640, trendlines 639 and 649 for the second intermediate segment 630 and the distal segment 640 may be merged. The electronic device may also determine whether to merge further based on a difference 651 between the distal trend value 631 of the second intermediate segment 630 and the proximal trend value 641 of the distal segment 640. The electronic device may merge trendlines 639 and 649 based on the difference 651 between trend values of segments at a vascular bifurcation 650 being less than or equal to a merging threshold. Conversely, merging of the trendlines 639 and 649 may be skipped based on the difference 651 between the trend values exceeding the merging threshold. The electronic device may determine a new first trendline 670 using diameter values 690 belonging to the second intermediate segment 630 and the diameter values 690 belonging to the distal segment 640. A diameter value of a vascular bifurcation between the second intermediate segment 630 and the distal segment 640 may be excluded from trendline calculation.

In addition, the electronic device may determine whether to merge the trendlines 639 and 649 of vessel segments in order from the vessel segment furthest from the coronary artery ostium to the vessel segment closest to the coronary artery ostium among the segmented vessel segments. In FIG. 6, the new first trendline 670 may be obtained by merging the trendlines 639 and 649 of the distal segment 640 furthest from the coronary artery ostium and the second intermediate segment 630. Thereafter, the electronic device may determine whether to merge trendlines for the first intermediate segment 620 and the proximal segment 610.

Figure 7:
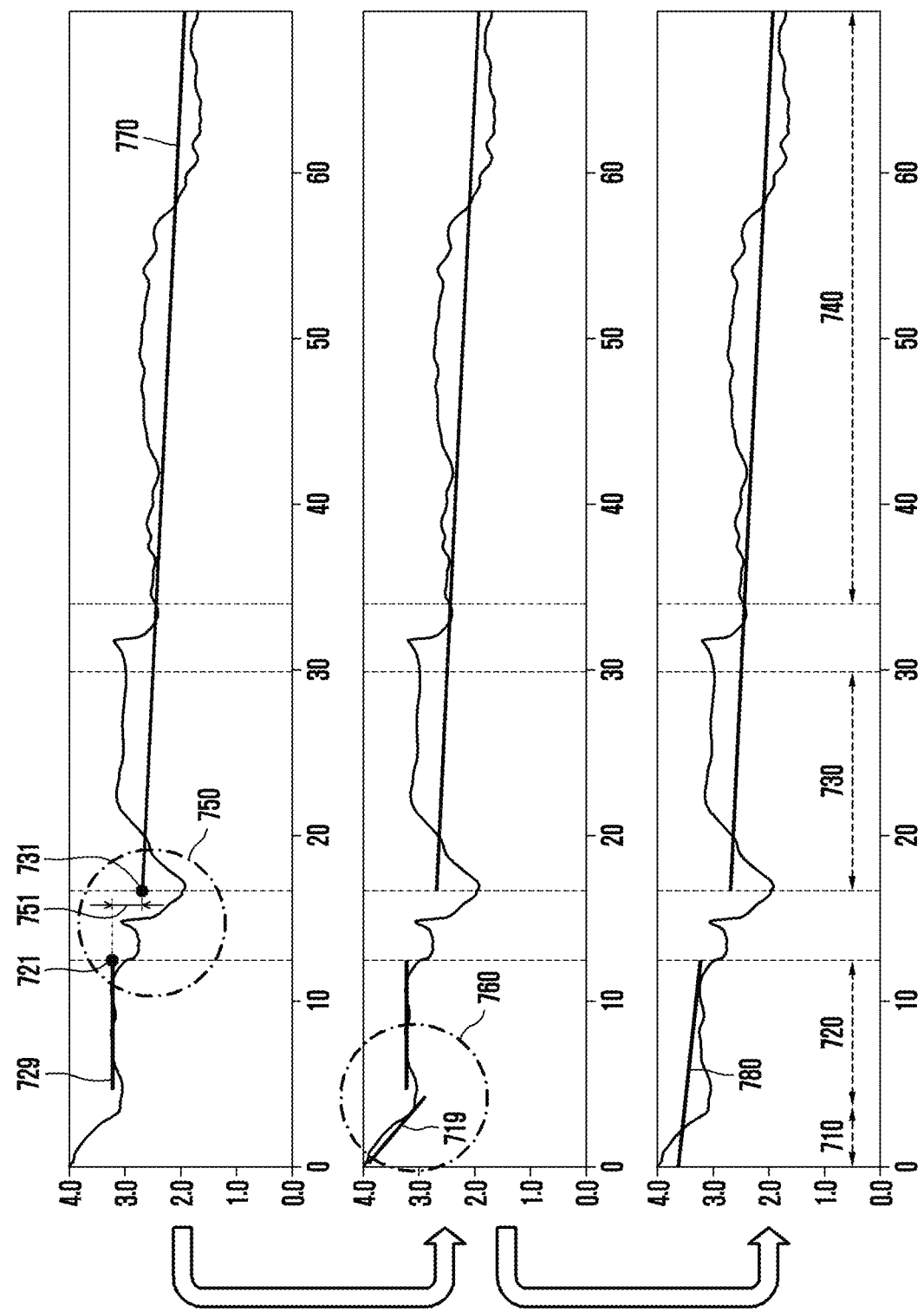

For example, in FIG. 7, an electronic device may determine whether to merge a new first trendline 770 (e.g., the merged first trendline 670 in FIG. 6) merged for a second intermediate segment 730 and a distal segment 740 into a first intermediate segment 720, based on a trend value difference 751 at a vascular bifurcation 750. In the example illustrated in FIG. 7, a distal trend value 721 of a trendline 729 calculated for the first intermediate segment 720 may be greater than a proximal trend value 731 of the new first trendline 770. The electronic device may skip the merging of the first trendline 729 calculated for the first intermediate segment 720 and the new first trendline 770. The electronic device may resume determining whether to merge trendlines from the first intermediate segment 720. For example, the electronic device may determine whether to merge trendlines of the proximal segment 710 and the first intermediate segment 720, based on the difference between a distal trend value of a trendline 719 of a proximal segment 710 and a proximal trend value of a trendline 729 of the first intermediate segment 720 with respect to a vascular bifurcation 760. Since the distal trend value of the trendline 719 of the proximal segment 710 is less than the proximal trend value of the trendline 729 of the first intermediate segment 720, the electronic device may determine another new first trendline 780 by merging the trendlines of the proximal segment 710 and the first intermediate segment 720. As a result, in the example illustrated in FIG. 7, the electronic device may obtain a new first trendline 770 merged for the second intermediate segment 730 and the distal segment 740 and another new first trendline 780 merged for the proximal segment 710 and the first intermediate segment 720.

Figure 8:
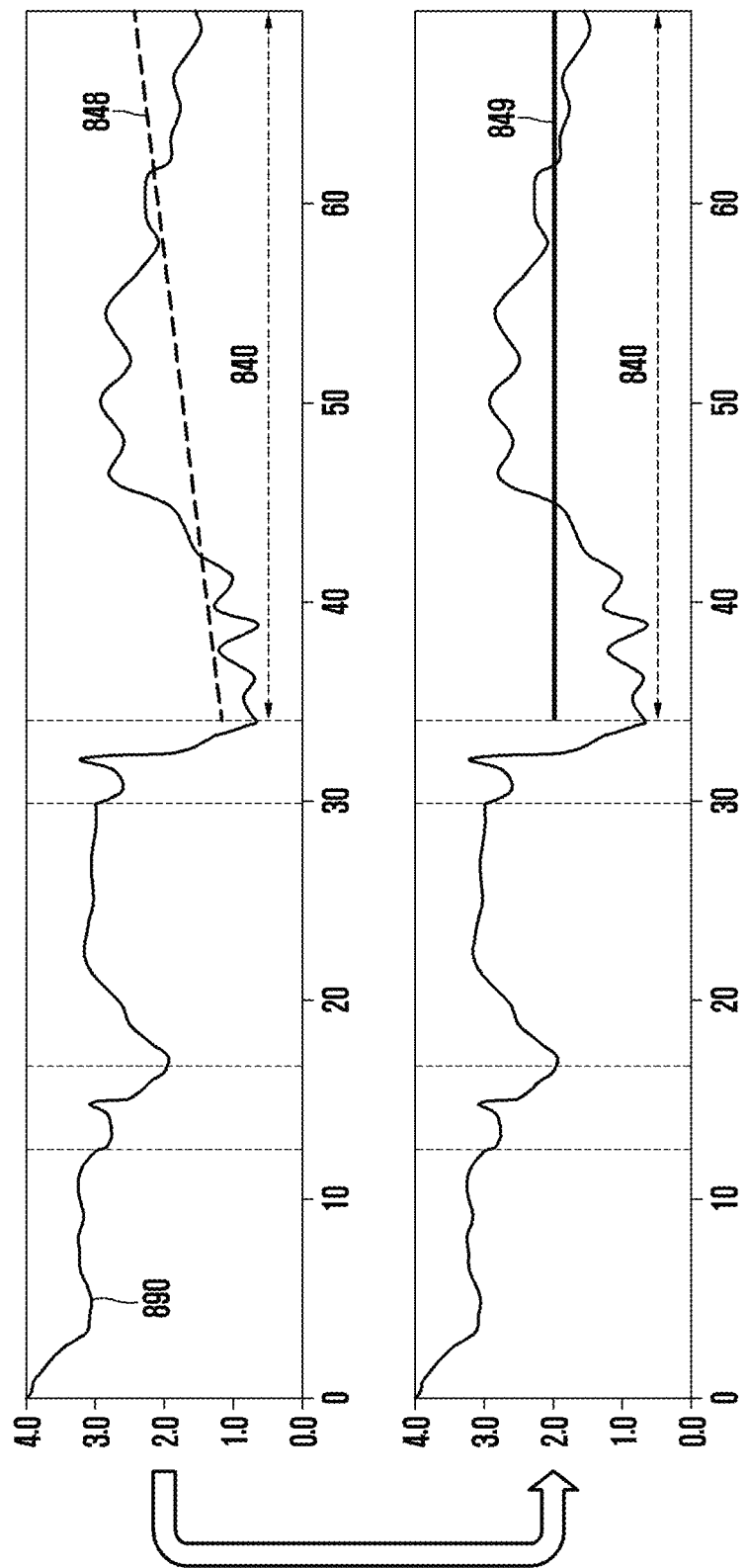
Figure 9:
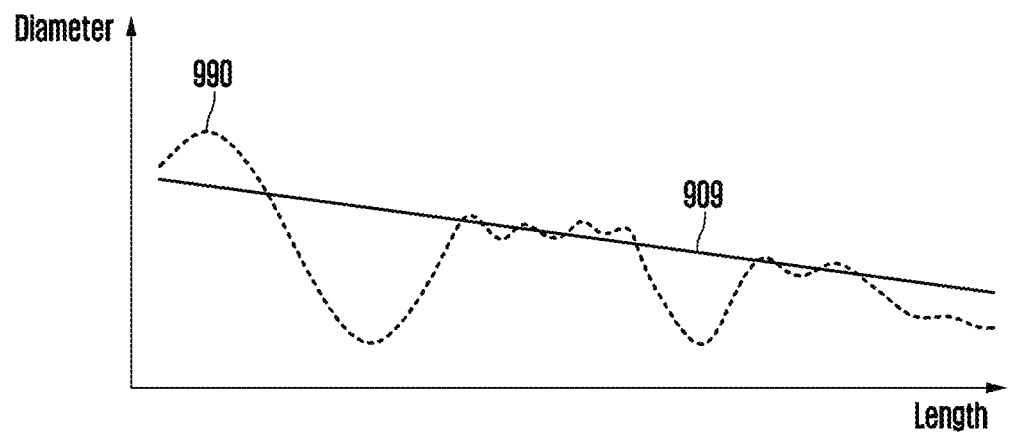

For reference, as illustrated in FIG. 8, an electronic device may determine an upper limit value of a slope of a trendline for each vessel segment. For example, the electronic device may limit the slope of a trendline that exceeds a reference slope among trendlines to the reference slope. In the example illustrated in FIG. 8, the reference slope may be set to 0. The electronic device may obtain a new first trendline 849 having a slope of 0 when the slope of a trendline 848 calculated based on diameter values 890 for a distal segment 840 exceeds 0. FIG. 9 illustrates an example of a first trendline obtained based on the merging of the linear regression and trendlines described above.

An electronic device according to an embodiment may visualize a first trendline 909 obtained as described above with reference to FIGS. 3 to 8. The first trendline 909 illustrated in the example in FIG. 9 may be a trendline obtained for one or two or more vessel segments. The electronic device may output the first trendline 909 along with a graph of diameter values 990 on a display. The electronic device may display the first trendline 909 by overlaying the first trendline 909 on the graph of the diameter values 990 when visualization of the first trendline 909 is activated by an input of a user. For reference, in the graph of the diameter values 990, the horizontal axis may represent the distance from the start position to an individual position and the vertical axis may represent a diameter value at each position.

Figure 10:
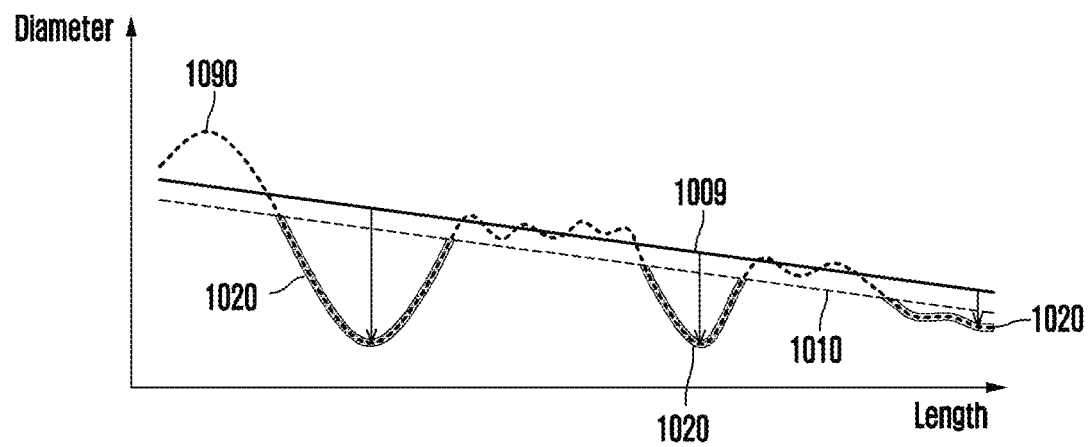
FIG. 10 illustrates lesion candidate determination according to an embodiment.
Figure 11:
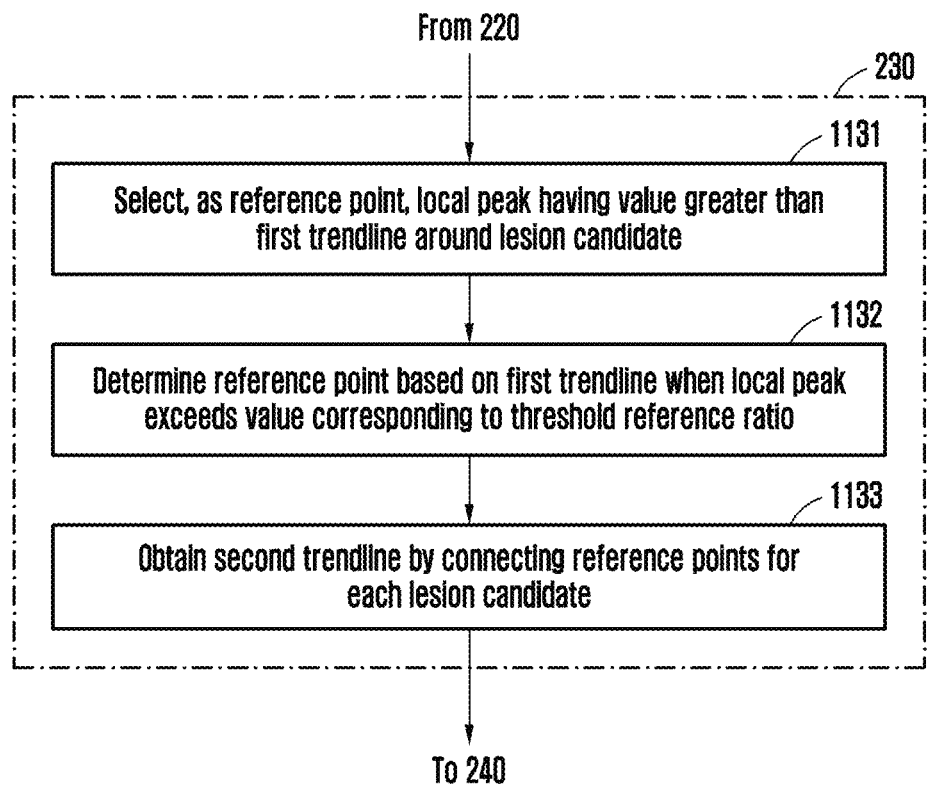
FIGS. 11 to 14 illustrate setting of a reference point and obtaining of a second trendline, according to an embodiment.

FIG. 10 illustrates lesion candidate determination according to an embodiment.

An electronic device according to an embodiment may determine a lesion candidate 1020 based on a first trendline 1009 as described above in operation 220 of FIG. 2. For example, the electronic device may determine, as the lesion candidate 1020, a portion having a diameter less than a value obtained by applying a first ratio to the first trendline 1009 among diameter values 1090. For example, the first ratio may be a real number greater than 0 and less than 1, and the electronic device may determine, as the lesion candidate 1020, a portion corresponding to positions having diameter values less than or equal to a line 1010 obtained by multiplying the first ratio by the first trendline 1009. In FIG. 10, the first ratio is illustrated as the same value for all regions, but embodiments are not limited thereto. For reference, the electronic device may visualize the lesion candidate 1020 along with the graph of the diameter values 1090.

FIGS. 11 to 14 illustrate setting of a reference point and obtaining of a second trendline, according to an embodiment.

In operation 1131, an electronic device (e.g., the electronic device 100 of FIG. 1) may select, as a reference point, a local peak having a value greater than a first trendline around a lesion candidate. The electronic device may select, as the reference point, the local peak having a value greater than the first trendline around the lesion candidate. For example, in the example illustrated in FIG. 12, the electronic device may select, as reference points, local peaks 1211, 1212, 1221, 1222, and 1231 having values greater than or equal to a first trendline 1209. As described above, diameter values 1290 below the first trendline 1209 may be determined as lesion candidates 1210 and 1220. For each lesion candidate, reference points close to the coronary artery ostium may be referred to as first reference points 1211, 1221, and 1231 (e.g., proximal reference points), and reference points far from the coronary artery ostium may be referred to as second reference points 1212 and 1222 (e.g., distal reference points).

Figure 12:
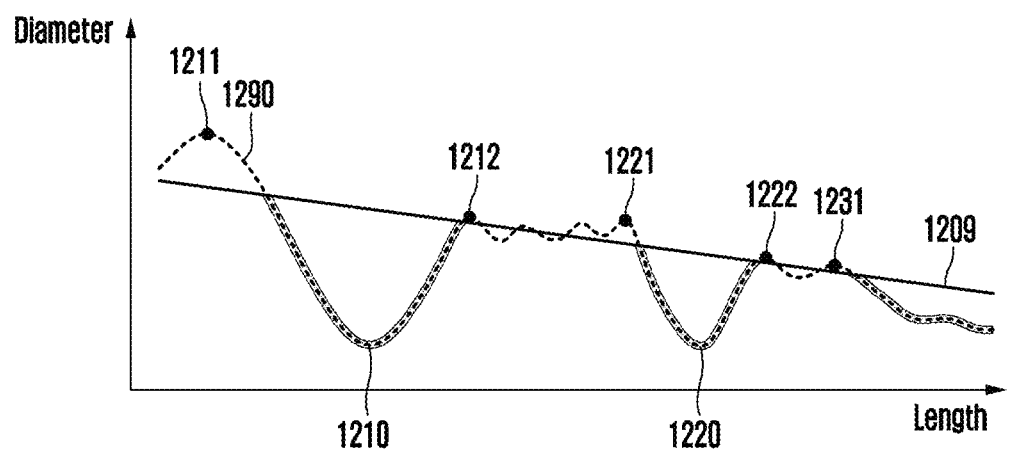
Figure 13:
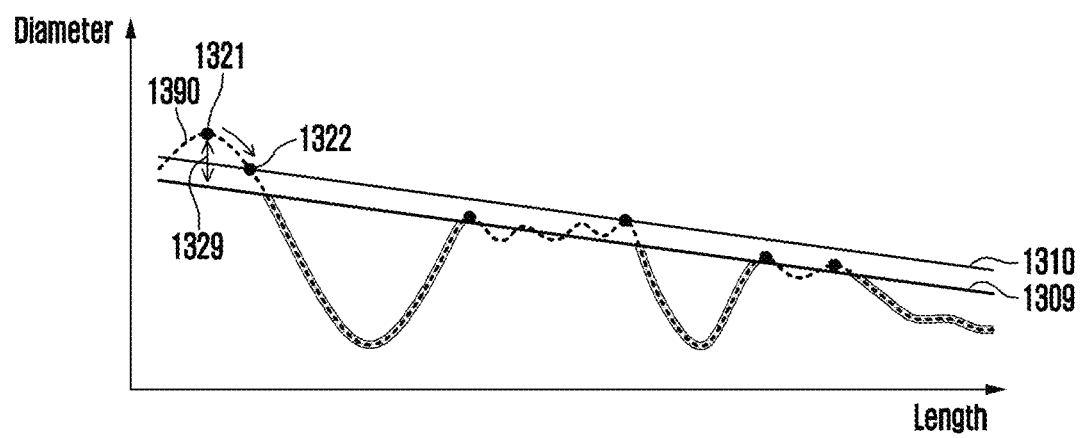

As illustrated in FIG. 12, a pair of reference points has to be detected for each lesion candidate, but for some lesion candidates, only one reference point may be detected. For example, the electronic device may exclude, from determination of a lesion site, a lesion candidate among lesion candidates for which detection of at least one of a first reference point close to a coronary artery ostium and a second reference point far from the coronary artery ostium is failed. However, embodiments are not limited thereto. When some reference points are not detected in regions before and after a lesion candidate, the electronic device may search again for a reference point based on a line (not shown) that reduces the first trendline 1209. For example, the electronic device may attempt to re-detect a local peak based on a value obtained by applying a threshold local ratio to the first trendline 1209, based on the fact that at least one (e.g., a distal reference point that has to be paired with the first reference point 1231 in FIG. 12) of a first reference point close to the coronary artery ostium and a second reference point far from the coronary artery ostium around a lesion candidate is not detected. The threshold local ratio may be a real number greater than 0 and less than 1. The electronic device may detect a local peak higher than a line (not shown) obtained by multiplying the first trendline 1209 by the threshold local ratio. In this case, a lesion candidate for which local peak detection still fails may be excluded from the determination of a lesion site.

Then, in operation 1132, the electronic device may determine a reference point 1322 based on the first trendline when the local peak exceeds a value corresponding to the threshold reference ratio. For example, the electronic device may select, as the reference point 1322, a point at which a value corresponding to the diameter of a vascular region appears among values obtained by applying the threshold reference ratio to the first trendline, based on the local peak exceeding a value obtained by applying the threshold reference ratio (e.g., K, where K is a real number greater than or equal to 1) to the first trendline. In the example illustrated in FIG. 13, the electronic device may detect a local peak 1321 on a first trendline 1309. When a difference 1329 between the local peak 1321 and the first trendline 1309 exceeds a threshold, the electronic device may set another point, instead of the local peak 1321, as a reference point 1322. For example, the electronic device may select, as a reference point 1322, a point at which a line 1310 and a graph corresponding to diameter values 1390 intersect, based on the local peak 1321 being higher than the line 1310 obtained by multiplying the first trendline by the threshold reference ratio.

Figure 14:
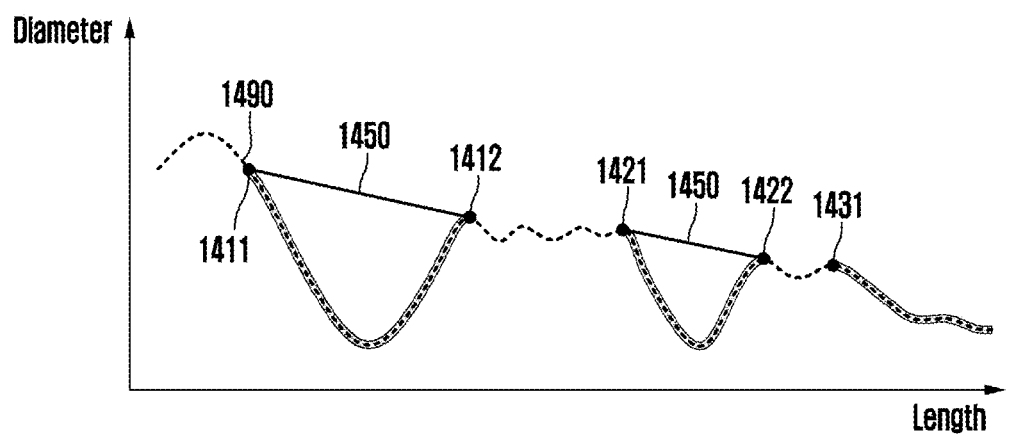

Subsequently, in operation 1133, the electronic device may obtain a second trendline 1450 by connecting reference points for each lesion candidate. For example, as illustrated in FIG. 14, the electronic device may obtain the second trendline 1450 by connecting first reference points 1411 and 1421 to each other and connecting second reference points 1412 and 1422 to each other for each lesion candidate. As described above in operation 1131, the second trendline 1450 may be generated only for paired reference points, and for a reference point (e.g., a reference point 1431 of FIG. 14) where one of a proximal reference point and a distal reference point is missing, the generation of a second trendline and determination of a lesion site may be excluded.

The electronic device according to an embodiment may visualize the reference points and the second trendline obtained as described above. For example, the electronic device may overlay at least one of the reference point and the second trendline on a graph of diameter values 1490 and visualize at least one of the reference point and the second trendline. The electronic device may output a graphical representation corresponding to an item activated by an input of a user, among the reference point and the second trendline, using a display along with a graph of diameter values.

Figure 15:
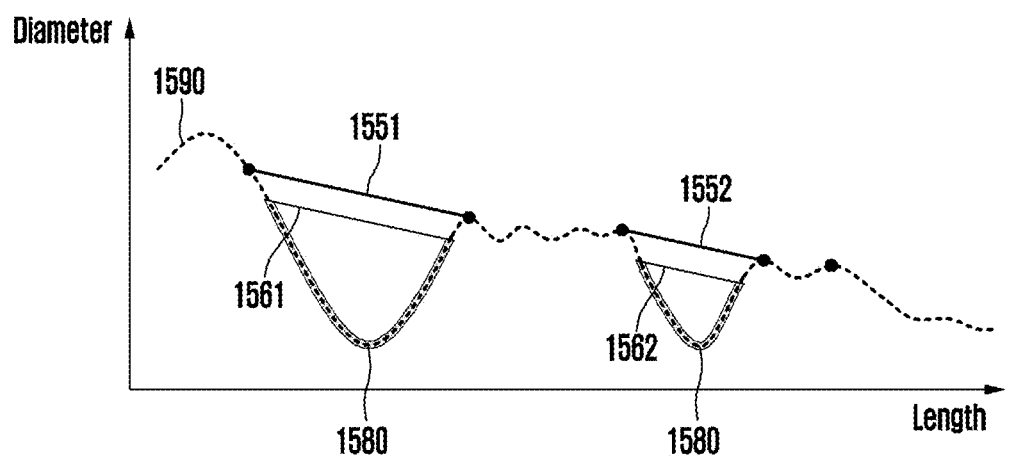
FIGS. 15 and 16 illustrate determination of a lesion site, according to an embodiment.
Figure 16:
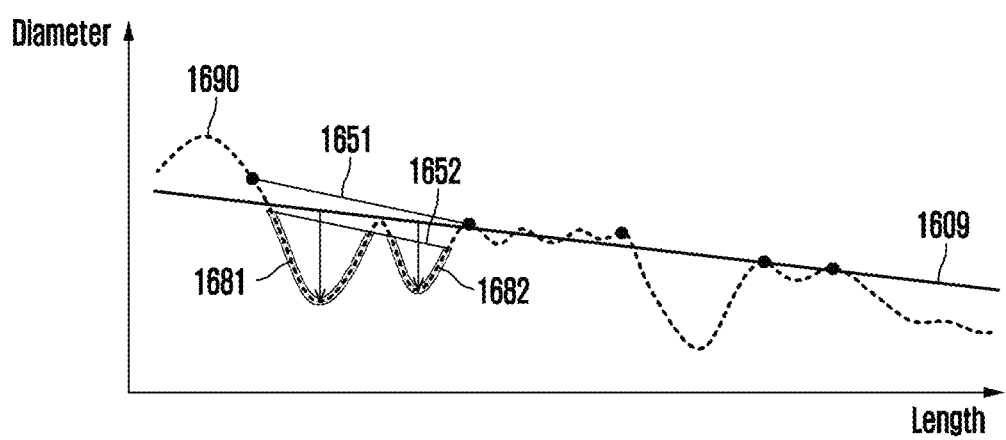

FIGS. 15 and 16 illustrate determination of a lesion site, according to an embodiment.

FIG. 15 illustrates an operation of determining a lesion site from among lesion candidates.

An electronic device (e.g., the electronic device 100 of FIG. 1) according to an embodiment may determine, based on a second trendline, a lesion site from among lesion candidates as described in operation 240 of FIG. 2. For example, the electronic device may determine, as a lesion site, a region having a diameter less than a value obtained by applying a second ratio to the second trendline among regions corresponding to the lesion candidates. In the example illustrated in FIG. 15, the electronic device may determine, as lesion sites 1580, portions lower than lines 1561 and 1562 obtained by applying second ratios to second trendlines 1551 and 1552. A second ratio (e.g., m) is a real number greater than 0 and less than 1 and may have different values depending on lesion candidates and/or positions. For example, in FIG. 15, the second ratio is illustrated as having the same value for the second trendline 1551 for a first lesion candidate and the second trendline 1552 for a second lesion candidate, but embodiments are not limited thereto. For example, the electronic device may determine the second ratio based on the value of a corresponding point on the first trendline. The electronic device may set a second ratio value applied to the second lesion candidate positioned far from a coronary artery ostium to be less than a second ratio value applied to the first lesion candidate positioned close to the coronary artery ostium. For example, the electronic device may apply a second ratio value of 0.7 to the first lesion candidate positioned close to the coronary artery ostium and apply a second ratio value of 0.5 (or 0.3) to the second lesion candidate positioned far from the coronary artery ostium. In other words, it may be understood that a lesion site is determined relatively conservatively for the first lesion candidate positioned proximally compared to the second lesion candidate positioned distally. The electronic device may also visualize the second trendlines 1551 and 1552 along with a graph of diameter values 1590.

An operation of determining whether to recognize adjacent lesion sites as a single lesion is described with reference to FIG. 16.

An electronic device (e.g., the electronic device 100 of FIG. 1) may determine that lesion sites 1681 and 1682 are included in the same lesion, based on the fact that the lesion sites 1681 and 1682 determined based on a second trendline 1651 are detected below a first trendline. In the example illustrated in FIG. 16, the two lesion sites 1681 and 1682 may be detected below a line 1652 obtained by applying a second ratio to the second trendline 1651 for one lesion candidate. In this case, the electronic device may determine that the two lesion sites (e.g., 1681 and 1682) are a single lesion site, based on the fact that a local peak appearing in an intermediate region between the two lesion sites (e.g., 1681 and 1682) is less than the first trendline.

In another example, when lesion candidates are adjacent to each other, the electronic device may determine whether to determine the lesion candidates and the intermediate region as a single lesion site, based on a ratio between the maximum diameter value among diameter values 1690 in the intermediate region between the lesion candidates and a value (e.g., a first trend value) along the first trendline at a point corresponding to the maximum diameter value. For example, the electronic device may extract the maximum diameter value among the diameter values 1690 of the intermediate region between the first lesion site 1681 and the second lesion site 1682, in the example illustrated in FIG. 16. The electronic device may determine that the two lesion sites 1681 and 1682 are included in the same lesion, based on the ratio between the extracted maximum diameter value and the first trend value at a corresponding position being within a predetermined range (e.g., a range including 1). The closer the ratio between the extracted maximum diameter value and the first trend value at the corresponding position is to 1, the higher the likelihood that the two lesion sites 1681 and 1682 are included in the same lesion.

In another example, the electronic device may determine whether lesion candidates adjacent to each other belong to the same lesion, based on the distance between the lesion candidates adjacent to each other among the plurality of lesion candidates. The electronic device may determine to merge the candidates adjacent to each other when the distance between the lesion candidates is less than a predetermined value when the lesion candidates are adjacent to each other. For example, the electronic device may determine to merge two lesion candidates into a single lesion when the distance between the two lesion candidates is less than 15 mm. Here, the predetermined value may be a value less than or equal to 15 mm but is not limited thereto, and the predetermined value may vary depending on user settings.

The electronic device according to an embodiment may select, based on an input of a user, at least one of a first trendline 1609, a lesion candidate, a reference point, the second trendline 1651 based on the reference point, and the lesion sites 1681 and 1682 determined based on the second trendline and may visualize a graphical representation corresponding to the selected item along with a graph of the diameter values 1690 using a display.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The invention claimed is:

1. A lesion determination method performed by a processor, the lesion determination method comprising:
   obtaining a first trendline related to a diameter of a vessel from a medical image;
   determining a lesion candidate within the vessel, based on the first trendline;
   obtaining a second trendline based on a reference point; and
   determining a lesion site within the lesion candidate, based on the obtained second trendline,
   wherein the obtaining of the first trendline comprises:
      segmenting a vascular region, which is an analysis target, into one or more vessel segments in the medical image; and
      determining whether to merge trendlines calculated for each of the one or more vessel segments and a vessel segment adjacent to a corresponding vessel segment.

2. The lesion determination method of claim 1, wherein the segmenting of the vascular region into the one or more vessel segments comprises segmenting the vascular region into the one or more vessel segments based on a vessel bifurcation, and
   the determining of whether to merge the trendlines comprises: calculating the trendlines for the one or more vessel segments; and determining whether to merge the trendlines based on diameter values of adjacent positions based on the vessel bifurcation on the trendlines.

3. The lesion determination method of claim 2, wherein the segmenting of the vascular region into the one or more vessel segments comprises determining whether to segment the vascular region into the one or more vessel segments based on the vessel bifurcation, based on a diameter value at the vessel bifurcation of a first vessel segment and a diameter value at the vessel bifurcation of a second vessel segment.

4. The lesion determination method of claim 1, wherein the determining whether to merge the trendlines comprises determining a new trendline by merging a trendline for a first vessel segment with a trendline for a second vessel segment, based on a diameter value of a distal position being less than a diameter value of a proximal position, wherein the diameter value of the distal position is on a trendline calculated for the first vessel segment and the diameter value of the proximal position is on a trendline calculated for the second vessel segment.

5. The lesion determination method of claim 1, wherein the determining of the lesion candidate comprises determining, as the lesion candidate, a portion of a vascular region in the medical image, wherein the portion has a diameter less than a value obtained by applying a first ratio to the first trendline.

6. The lesion determination method of claim 1, wherein the obtaining of the second trendline based on the reference point comprises selecting a local peak as the reference point, the local peak having a value greater than the first trendline.

7. The lesion determination method of claim 6, wherein the selecting of the local peak as the reference point comprises selecting, as the reference point, a point at which a value corresponding to a diameter of the vascular region appears among values obtained by applying a threshold reference ratio to the first trendline, based on the local peak being greater than a value obtained by applying the threshold reference ratio to the first trendline.

8. The lesion determination method of claim 1, wherein the determining of the lesion site comprises determining, as the lesion site, a region with a diameter less than a value obtained by applying a second ratio to the second trendline, within a region corresponding to the lesion site.

9. The lesion determination method of claim 1, wherein the determining of the lesion site comprises, when lesion candidates are adjacent to each other, based on a ratio between a maximum diameter value among diameter values in an intermediate region between the lesion candidates and a value along the first trendline at a point corresponding to the maximum diameter value, determining whether to determine the lesion candidates and the intermediate region as a single lesion site.

10. The lesion determination method of claim 1, wherein the determining of the lesion site comprises, when lesion candidates are adjacent to each other, determining to merge the lesion candidates adjacent to each other when a distance between the lesion candidates is less than a predetermined value.

11. An electronic device comprising:
   an image obtainer configured to obtain a medical image;
   a display configured to output the medical image;
   a memory configured to store computer-executable instructions; and a processor configured to execute the instructions stored in the memory, wherein the instructions are configured to output, on the display along with the medical image, at least one of a first trendline related to a global trend of a vessel diameter for each of a plurality of vessel segments segmented from a vessel comprised in the medical image, a reference point positioned above the first trendline, a second trendline related to a local trend of the vessel diameter determined based on the reference point, and a lesion site positioned below the second trendline, and wherein the processor is further configured to:
   segment a vascular region, which is an analysis target, into one or more vessel segments in the medical image; and
   determine whether to merge trendlines calculated for each of the one or more vessel segments and a vessel segment adjacent to a corresponding vessel segment.

* * * * *